United States Patent [19]

Osawa et al.

[11] Patent Number: 5,956,037
[45] Date of Patent: Sep. 21, 1999

[54] VIDEO INFORMATION PROVIDING/RECEIVING SYSTEM

[75] Inventors: Noriyuki Osawa; Takayasu Koike; Kazuaki Sato, all of Kanagawa, Japan

[73] Assignee: Fujitsu Limited, Kanagawa, Japan

[21] Appl. No.: 08/687,905

[22] Filed: Jul. 26, 1996

[30] Foreign Application Priority Data

Jul. 26, 1995 [JP] Japan .................................. 7-190534

[51] Int. Cl.[6] .................................................. G09B 29/00
[52] U.S. Cl. ............................................................ 345/418
[58] Field of Search .................................. 345/418, 433, 345/434, 436, 438, 419

[56] References Cited

U.S. PATENT DOCUMENTS

| | | | |
|---|---|---|---|
| 5,574,845 | 11/1996 | Benson et al. | 345/418 |
| 5,621,429 | 4/1997 | Yamaashi et al. | 345/419 |
| 5,671,342 | 9/1997 | Millier et al. | 345/418 |
| 5,707,288 | 1/1998 | Stephens | 345/418 X |

FOREIGN PATENT DOCUMENTS 5-54085  3/1993  Japan .

*Primary Examiner*—Cliff N. Vo
*Attorney, Agent, or Firm*—Helfgott & Karas, PC.

[57] ABSTRACT

While a video information providing host is sending video information to a user terminal through a transmission line corresponding to a request received from the user terminal, an operation history information writing unit writes an operation history for various operations for video information of the user terminal as operation history information to an operation history storing unit. The operation history information is written for each of a plurality of types of video information and for each of users who use user terminals that access each of the types of video information or each of user terminals that access each of the types of video information. While a video information editing unit is editing requested video information corresponding to a request received from a user and corresponding to operation history information, the video information editing unit sends the edited video information to a user terminal that the requesting user operates.

14 Claims, 14 Drawing Sheets

401 — 
VIDEOID : EDUCATION01  ⇨ EQUIVALENT TO "VIDEO INFORMATION ID" SHOWN IN FIG. 3
USERID : OHSAWA

SEQUENCE NO       : 001  ⇨ EQUIVALENT TO "SEQUENTIAL NO." SHOWN IN FIG. 3
REFERENCE         : OFF  ⇨ EQUIVALENT TO "OTHER ID REFERENCE FLAG" SHOWN IN FIG. 3
MANUAL OPERATION  : ON   ⇨ EQUIVALENT TO "MANUAL OPERATION PRIORITY FLAG" SHOWN IN FIG. 3
CHILD OPERATION   : ON   ⇨ EQUIVALENT TO "SIMULATANEOUS TRANSMISSION DESTINATION INTERRUPT FLAG" SHOWN IN FIG. 3
HISTORY :                ⇨ EQUIVALENT TO "CONTENT OF OPERATION HISTORY INFORMATION" SHOWN IN FIG. 3
 TIME 00 : 00 - 01 : 22  FF
 TIME 01 : 22 - 10 : 44  PLAY
 TIME 10 : 44 - 10 : 55  SLOW
 TIME 10 : 55            PAUSE T=10
 TIME 10 : 55 - 10 : 30  REW
 TIME 10 : 30            STOP

402 —
VIDEOID : EDUCATION01

USERID : OHSAWA

SEQUENCE NO.      : 002
 REFERENCE         : ON
 MANUAL OPERATION  : OFF
 CHILD OPERATION   : OFF
 HISTORY :
  TIME 00 : 00 - 10 : 22  PLAY

403 —
VIDEOID : EDUCATION01

USERID : SATOH

SEQUENCE NO.      : 001
 REFERENCE         : ON
 MANUAL OPERATION  : ON
 CHILD OPERATION   : OFF
 HISTORY :
  TIME 00 : 00 : 00 - 02 : 22  PLAY

404 —
VIDEOID : MOVIE001

FIG. 4

VIDEO INFORMATION PROVIDING/RECEIVING SYSTEM

BACKGROUND OF THE INVENTION

1. Field of the Invention

The present invention relates to a video information providing/receiving system for use with a system for receiving video information from a host computer providing the video information through a transmission line (such as a telephone line or a LAN) corresponding to a request issued from a user terminal.

2. Description of the Related Art

In recent years, as the needs of users vary, video-on-demand services (referred to as VOD services) that totally manage video information and send video information to user terminals, through a transmission line corresponding to a request from a user, are becoming common.

In a VOD service, a user can request a service provider for desired video information such as a movie, etc. at any desired time. In addition, the user can perform a fast-forward operation and a slow playback operation on video information.

In a conventionally proposed VOD service, when a user requests part of the same program again, he or she can perform a playback operation from the beginning with a playback key, a fast-forward key, and so forth, so as to search a most desired part of the program in advance, and play back that part in a similar manner as in the preceding time.

Moreover, in the conventional VOD service, the other users can see the same video information at the same time. As with the above case, these users can search for their desired portions of the video information with such keys, while watching the displays of their terminals.

Furthermore, in the conventional VOD service, the users can edit/process provided video information with their video recording units or the like.

When a user sees video information that he or she has seen before, he or she tends to perform the same playback operations (a fast-forward operation, a rewind operation, a slow-playback operation, and so forth, for particular portions of the video information) as before. For example, a teacher will give a particular lecture to a particular audience with the same educational video information that has been used for another audience. In this case, the user would repeat various operations with his or her receiving terminal unit while seeing the display thereof.

In addition, other users may see the same video information for the same reason. For example, the other members of the same group may see the same video research information. Again, in this case, the other users would repeat the same operations as the user who saw it the first time.

Furthermore, when a user edits/processes received video information with his or her video recording unit, he or she should perform the required operations while seeing the display thereof.

SUMMARY OF THE INVENTION

An object of the present invention is to allow a user to easily reproduce operations that he or she performed before, and easily edit/process video information.

According to an aspect of the present invention, since operation histories for a plurality of users for particular video information are provided, for example, a teacher can compare/analyze operations performed by a plurality of students on educational video information (more practically, portions in which the students were interested or portions that they skipped with a fast-forward operation).

According to another aspect of the present invention, when a user receives video information that he or she accessed before and wants to perform the same operations as before (for example, when a teacher gives a particular lecture to a particular audience with the same educational video information that has been used for another audience), the educational video information is played back by the same method as before, without repeating the same operations.

According to another aspect of the present invention, since video information is simultaneously transmitted corresponding to particular operation history information, the operability for a conference system held among a plurality of remote locations and the like, can be improved.

According to another aspect of the present invention, in the case that video information is multicast, by controlling whether or not an interrupt from a user terminal on a called side (multicasting destination), a calling side (a particular user terminal that accessed the video information providing host for the first time) controls whether to perform complete control.

According to another aspect of the present invention, since various operations (a fast-forward operation, a rewind operation, a slow-playback operation, and so forth) are performed on video information received at a user terminal side corresponding to operation history information thereon, the loads on the video information providing host side and the transmission line side can be reduced.

According to another aspect of the present invention, since video information to be received on the user terminal side is sent to a user terminal on a batch basis, the loads on the video information providing host side and the transmission line side can be further reduced.

According to another aspect of the present invention, since operation history information is composed in a file format which a user can edit with an editor or the like, he or she can easily edit/process video information.

According to another aspect of the present invention, since a plurality of patterns of an operation history for particular video information is provided to a user, by designating a particular pattern, the user can reference a plurality of types of operation history information with which one type of video information has been edited/processed. As a result, when the same video source is used for different audiences with different emphasized portions, the operability is improved and the video source can be more flexibly used.

According to another aspect of the present invention, when a user references video information that another user accessed before corresponding to the operation history information thereof (for example, when the same group members reference research video information or when a teacher analyzes what portion of educational video information students saw), the operation history information of other users can be easily reproduced/checked.

According to another aspect of the present invention, when a user make a setting to prohibit other users from referring to the operation history information of the user, the history information that the user wants to leave unchanged is kept secret.

According to another aspect of the present invention, when a manual interrupt operation can be enabled while video information corresponding to an operation history is being played back, other operations that are not included in the operation history can be performed. In addition, the operation history can be slightly adjusted.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 4 is a schematic diagram showing a real data structure of an operation history information file;

DETAILED DESCRIPTION OF THE PREFERRED EMBODIMENTS

Figure 1A:
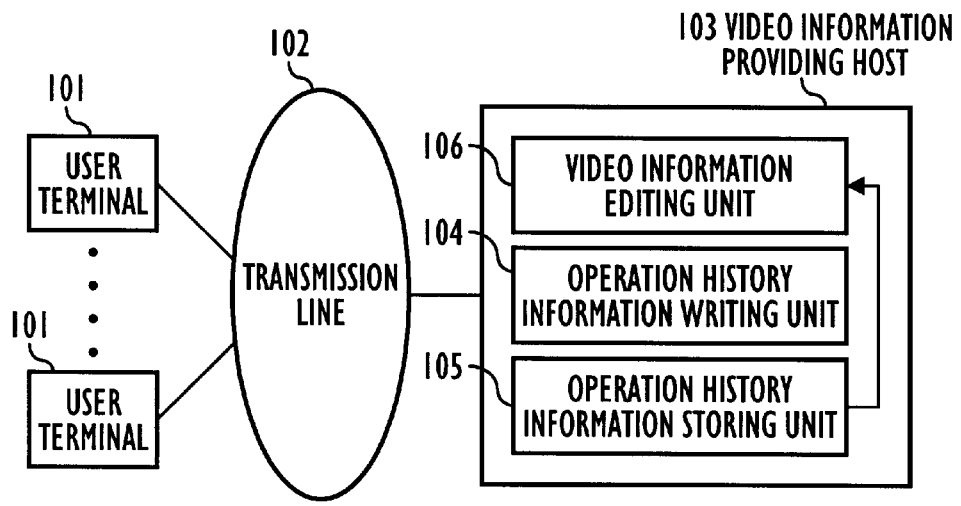
FIGS. 1A and 1B are block diagrams according to the present invention.
Figure 1B:
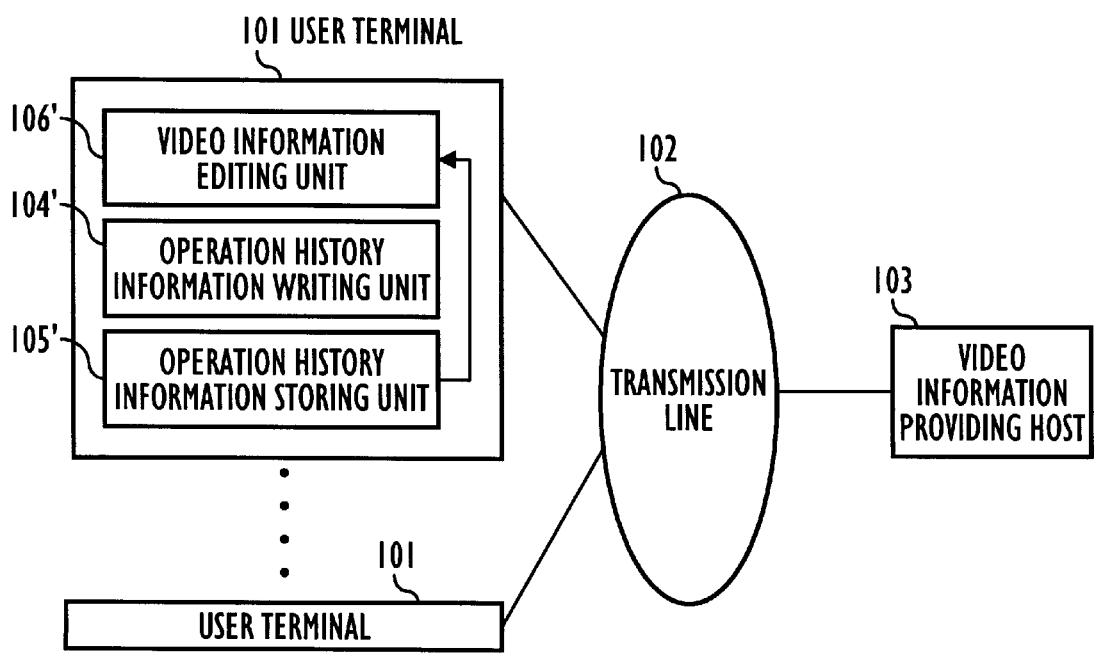

As shown in FIGS. 1A and 1B, the present invention is a video information providing/receiving system in which a user terminal 101 requests a video information providing host 103 for various operations through a transmission line 102, and the user terminal 101 receives video information corresponding to the various operations from the video information providing host 103.

FIG. 1(A) is a block diagram showing a first aspect of the present invention. The video information providing host 103 has an operation history information storing unit 105, an operation history information writing unit 104, and a video information editing unit 106.

The operation history information storing unit 105 stores operation history information.

While the video information providing host 103 is sending video information to a user terminal 101 through the transmission line 102 corresponding to a request received from the user terminal 101, the operation history information writing unit 104 writes the history of various operations (as operation history information) for the video information sent to the user terminal 101 to the operation history information storing unit 105, so as to allow the video information to be played back using the same operations as the various operations. In practice, the operation history information is written to the operation history information storing unit 105 for each of a plurality of pieces of video information and for each of users who use user terminals 101 that access each of pieces of video information or for each of user terminals 101 that access each of pieces of video information.

In the case that one user sends a video information transmission request from a user terminal 101 to the video information providing host 103, when the operation history information storing unit 105 of the video information providing host 103 stores operation history information corresponding to the requested video information and corresponding to the requesting user or the user terminal 101 that the user operates, after the operation history information storing unit 105 stores the operation history information corresponding to the requested video information, and the requesting user or the user terminal 101 that the user operates, the video information editing unit 106 sends the edited video information to the user terminal 101 that the requesting user operates.

In the structure of the first aspect of the present invention, while the video information editing unit 106 is editing the requested video information corresponding to a request received from a particular user and corresponding to operation history information stored in the operation history information storing unit 105 and for the requested video information and for the particular requesting user or for the user terminal 101 that the particular user operates, the video information editing unit 106 can simultaneously transmit the requested video information to user terminals 101 that a plurality of users operate.

In this case, when the operation history information writing unit 104 writes operation history information for each of a plurality of pieces of video information and for each of users that access each of the pieces of video information or for each of user terminals 101 that the users operate to the operation history information storing unit 105, the operation history information writing unit 104 controls the video information editing unit 106 permits whether or not a user as a simultaneous transmission destination can edit video information with a manual interrupt operation on the user terminal 101. When the manual interrupt operation is permitted, the video information editing unit 106 edits video information corresponding to a manual interrupt operation by a user on the user terminal 101 while the video information editing unit 106 is editing requested video information corresponding to the operation history information.

FIG. 1B is a block diagram of a second aspect of the present invention. A user terminal 101 has an operation history information storing unit 105', an operation history information writing unit 104', and a video information editing unit 106'.

As with the first aspect of the present invention, the operation history information storing unit 105' stores operation history information.

While the video information providing host 103 is sending video information to a user terminal 101 through a transmission line 102 corresponding to a request received the user terminal 101, the operation history information writing unit 104' writes the history of various operations for the video information of the user terminal 101 as operation history information to the operation history information storing unit 105' so as to allow the video information to be played back with the same operations as the various operations. In practice, the operation history information is written to the operation history information storing unit 105' for each of a plurality of pieces of video information and for each of users who accessed each of the pieces of video information.

In the case that one user sends a video information transmission request from a user terminal 101 to the video information providing host 103, when the operation history information storing unit 105' of the user terminal 101 stores operation history information corresponding to the requested video information and corresponding to the requesting user, the video information editing unit 106' edits and plays back the requested video information received from the video information providing host 103 according to the operation history information corresponding to the requested video information and the requesting user.

In the structure of the second aspect of the present invention, the user terminal 101 also has a buffer that stores requested video information received from the video information providing host 103 for each predetermined period of time or for each predetermined data amount. The video information editing unit 106' edits video information stored in the buffer.

Alternatively, in the structure of the second aspect of the present invention, the user terminal 101 also has a buffer that stores requested video information received from the video information providing host 103 on a batch basis. The video information editing unit 106' edits video information stored in the buffer.

In the structure of the first or second aspect of the present invention, the operation history information stored in the operation history information storing unit 105 or 105' may be composed of text format file data.

In the construction of the present invention, the operation history information storing unit 105 or 105' stores operation history information for each of pieces of video information, for each of users who access each of the pieces of video information or each of the user terminals 101 that the users operates, and for each of accesses made by the users or the terminals 101 that the users operate. The video information editing unit 106 or 106' edits video information according to one piece of the operation history information corresponding to requested video information, the requesting user or the user terminal 101 that the user operates, and each of a plurality of accesses, based on an instruction given by the user.

In the construction according to the present invention, the video information editing unit 106 or 106' edits video information according to operation history information corresponding to requested video information or to a requesting user or a user terminal 101 that the user operates, or according to operation history information corresponding to a user other than the requesting user to a user, to a user using a terminal other than the user terminal 101 that the user other than the requesting user operates, or corresponding to the user terminal 101 that the user operates corresponding to operation history information for a user who did not send a request or a user terminal 101 that the user operates.

In the structure of the present invention, when the operation history information writing unit 104 or 104' writes operation history information for each of a plurality of pieces of video information or for each of users who access each of the pieces of video information or each of user terminals 101 that the users operate, to the operation history information storing unit 105 or 105', the operation history information writing unit 104 or 104' can control the permission of whether or not a use by a user other than a user corresponding to the operation history information, by a user operating a terminal other than the user terminal that the user operates, or by the user terminal 101 that the user operates.

In the structure according to the present invention, when the operation history information writing unit 104 or 104' writes operation history information for each of a plurality of pieces of video information or for each of users who access each of the pieces of video information or each of user terminals 101 that the users operate to the operation history information storing unit 105 or 105', the operation history information writing unit 104 or 104' can control the permission of whether or not the video information editing means 106 or 106' can edit video information with a manual interrupt operation on a user terminal 101. When the manual interrupt operation is permitted, while the video information editing unit 106 or 106' is editing requested video information corresponding to the operation history information, the video information editing unit 106 or 106' edits video information corresponding to the manual interrupt operation on the user terminal 101 that the user operates.

When a user receives video information that he or she accessed before and wants to perform the same operations as before (for example, when a teacher gives a particular lecture to a particular audience with the same educational video information that has been used for another audience), the user can play back the educational video information without performing the same operations that he or she performed before.

Since operation histories for a plurality of users for particular video information are provided, for example a teacher can compare/analyze operations performed by a plurality of students for educational video information (more practically, portions in which the students were interested or portions that they skipped with a fast-forward operation).

Since video information can be simultaneously transmitted corresponding to particular operation history information, the operability for a conference system held among a plurality of remote locations and the like can be improved.

In the case that video information is simultaneously transmitted, since whether to permit an interrupt from a user terminal on a called side as a simultaneous transmission destination can be controlled, whether to perform a batch control can be controlled on a calling side (a particular user terminal that has accessed the video information providing host for the first time).

Since various operations (a fast-forward operation, a rewind operation, a slow-playback operation, and so forth) are performed on video information received at a user terminal side corresponding to operation history information thereof, the loads on the video information providing host side and the transmission line side can be reduced.

Since video information to be received on a user terminal side is sent to a user terminal on a batch basis, the loads on the video information providing host side and the transmission line side can be further reduced.

Since operation history information is composed in a file format which a user can edit with an editor or the like, he or she can easily edit/process video information.

Since a plurality of patterns of an operation history for particular video information can be provided to a user, by designating a particular pattern, the user can reference a plurality of pieces of operation history information to each of which a plurality of editions/processes are added. As a result, when the same video source is used for different audiences with different emphasized portions, the operability is improved and the video source can be more flexibly used.

When a user references video information that another user accessed before according to the operation history information thereof (for example, when the same group members reference research video information or when a teacher analyzes what portion of educational video information students saw), the operation history information of other users can be easily reproduced/checked.

When a user chooses to prohibit other users from referring to the operation history information of the user, the history information that the user wants to leave unchanged is kept secret.

When a manual interrupt operation can be enabled while video information corresponding to an operation history is being played back, other operations that are not included in the operation history can be performed. In addition, the operation history can be slightly adjusted.

Next, with reference to the accompanying drawings, the embodiments of the present invention will be described in detail.

First Embodiment

Figure 2:
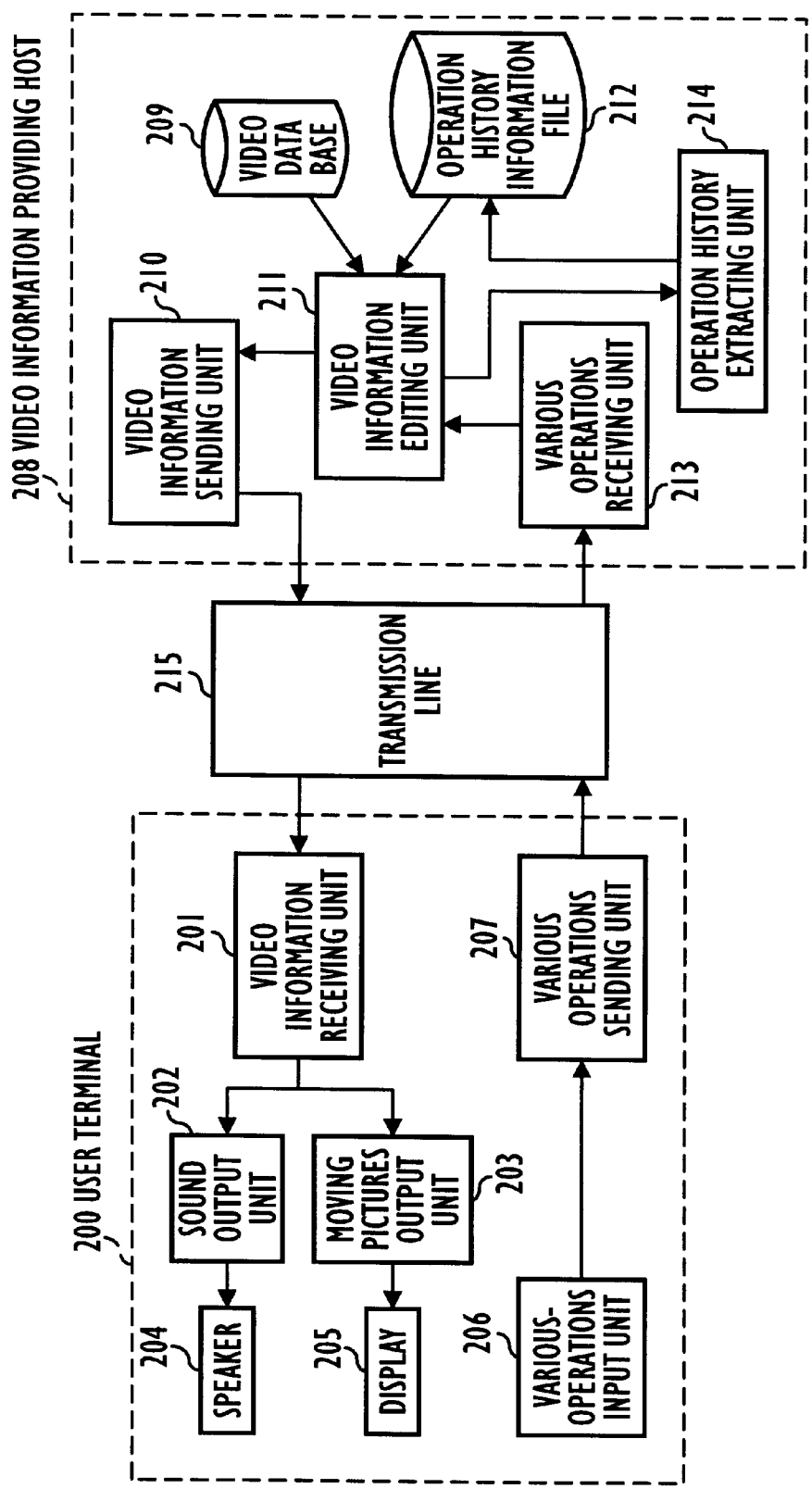
FIG. 2 is a block diagram showing a construction according to a first embodiment of the present invention (in the case that a host side has an operation history)

FIG. 2 is a block diagram showing a construction of a first embodiment of the present invention.

As a feature of the present invention, in the first embodiment, a video information providing host 208 stores an operation history information file 212. In this file 212, various operations (a playback operation, a fast-forward operation, a rewind operation, a stop operation, a pause operation, and so forth) that a user executed for received video information, are recorded.

In FIG. 2, a transmission line 215 is, for example, an ATM (Asynchronous Transfer Mode) transmission line.

In a user terminal 200, a video information receiving unit 201 receives video information from the video information providing host 208 through the transmission line 215. A sound output unit 202 outputs sound information of the video information to a speaker 204. A moving pictures output unit 203 outputs picture information to a display 205. A various-operations input unit 206 receives various operations for video information (such as a fast-forward operation, a rewind operation, and a slow playback operation) performed by a user. A various-operations sending unit 207 sends the operation information to the video information providing host 208 through the transmission line 215.

Next, a video information sending unit 210 of the video information providing host 208 sends video information read from a video database 209 through a video information editing unit 211 to a user terminal 200 through the transmission line 215. A various-operations receiving unit 213 receives various operations from a user terminal 200 through the transmission line 215 and sends the information to the video information editing unit 211. While the video information editing unit 211 is referencing an operation history information file 212, the video information editing unit 211 executes the operations received from the various-operations receiving unit 213 for video information that is being played back. The video information editing unit 211 sends the resultant video information to a video information sending unit 210. In addition, the video information editing unit 211 writes information of each operation to the operation history information file 212 through an operation history extracting unit 214.

Figure 3:
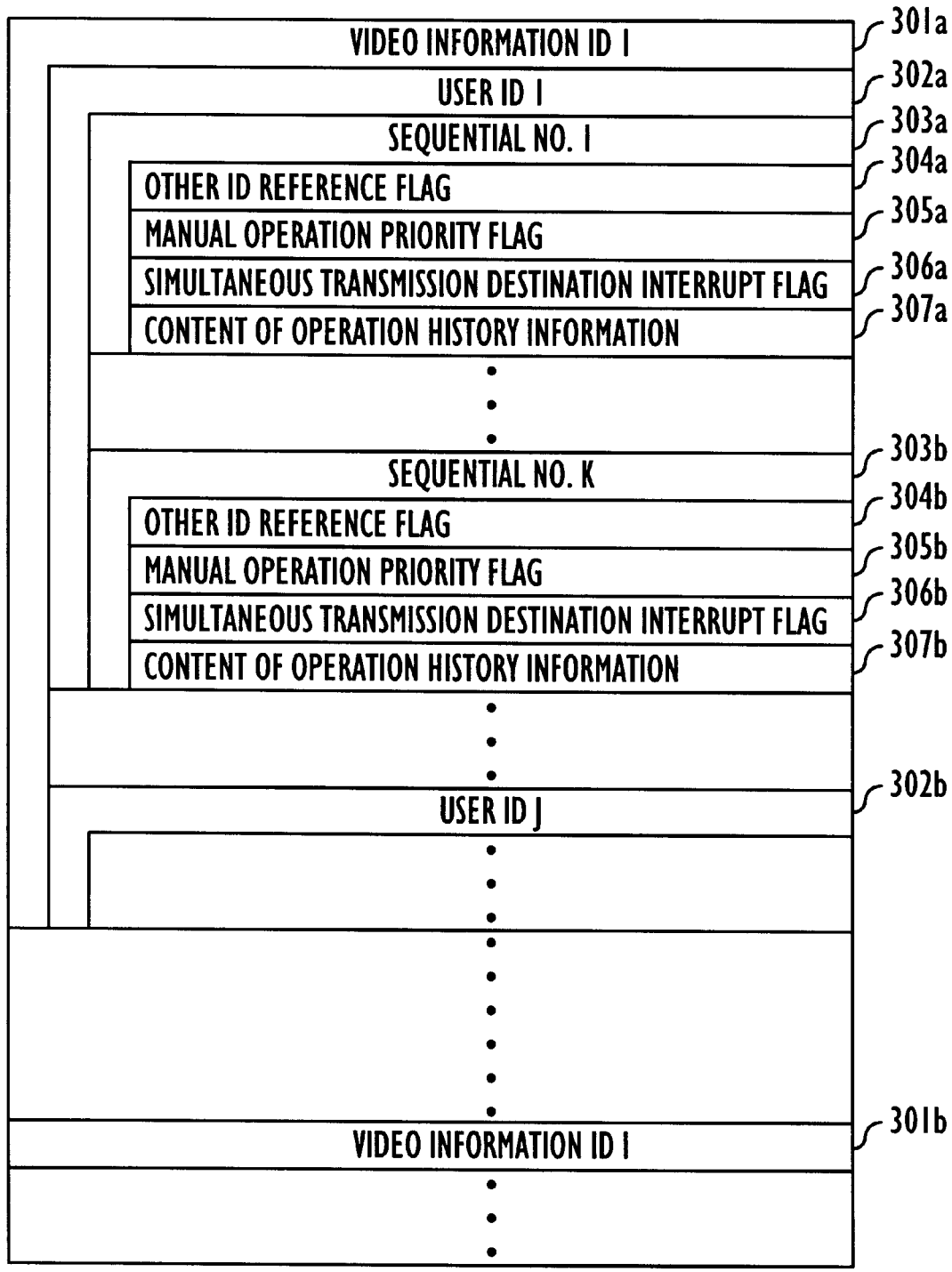
FIG. 3 is a schematic diagram showing a data structure of an operation history information file.

FIG. 3 is a schematic diagram showing a data structure of the operation history information file 212 stored in the video information providing host 208 shown in FIG. 2. Video ID 301a (301b) is data for identifying video information.

User ID 302a (302b) is data for identifying a user.

Sequential No. 303a (303b) is data for identifying the order of operation history information of one user with one user ID 302a (302b) for one piece of video information with one video information ID 301a (301b).

When the other ID reference flag 304a (304b) is ON, it represents that another user corresponding to a user ID (302a or 302b) other than a user ID (302a or 302b) to which contents of the operating history information corresponding to the other ID reference flag (304a or 304b), belongs can use operation history information of the user with the user ID 302a (302b). When the ID reference flag 304a (304b) is OFF, it represents that the above described other user cannot use the operation history information of the user with the user ID 302a (302b).

Manual operation priority flag 305a (305b) is data for identifying the priority of the playback of video information by an manual operation or the playback of video information corresponding to the operation history information file 212.

Simultaneous transmission destination interrupt flag 306a (306b) is not used in the first embodiment.

The content of operation history information 307a (307b) is data that represents real operation history.

The operation history information file 212 composed of the above-described data groups stores operation histories for a plurality of types (1 to i) of video information corresponding to video information ID 301a (301b). Thus, the operation history information file 212 can store operation histories for a plurality of (1 to i) users corresponding to user IDs 302a (302b) for each of a plurality of types of video information. In addition, the operation history information file 212 can store operation histories for a plurality of (i to k) sets corresponding to sequential Nos. 303a (303b) for each of the users.

FIG. 4 is a schematic diagram showing a real data structure of the operation history information file 212 having the data structure shown in FIG. 3. In FIG. 4, "SEQUENCE No" accords with the sequential No. 303a (303b) shown in FIG. 3. "REFERENCE" accords with the other ID reference flag 304a (304b) shown in FIG. 3. "MANUAL OPERATION" accords with the manual operation priority flag 305a (305b) shown in FIG. 3. "CHILD OPERATION" accords with the simultaneous transmission destination interrupt flag 306a (306b) shown in FIG. 3. Other items after "HISTORY" shown in FIG. 4 accord with the content of operation history information 307a (307b) shown in FIG. 3. These items are recorded as the operations executed time by time (counter value of video information).

Since the operation history information file 212 is recorded as a text image, the user can open the file and easily edit the contents of the file using an editor, etc.

Next, with reference to a flow chart shown in FIG. 5, a practical operation of the first embodiment will be described.

The user terminal 200 sends a connection request <501> to the video information providing host 208 through the transmission line 215. The video information providing host 208 sends back a response <502> corresponding to the request to the user terminal 200. Thus, a communication start (connection state) <503> takes place.

Next, the video information editing unit 211 of the video information providing host 208 sends a video information type input request <504> to the user terminal 200 so that the user of the user terminal 200 designates video information to be received from the video information providing host 208 corresponding to index information of the video information stored in the video database 209. The user operates the various-operations input unit 206 of the user terminal 200 so as to designate a video information type. Thus, the various-operations sending unit 207 of the user terminal 200 sends the designated video information type <505> to the video information providing host 208.

After the user designates the video information and the various-operations receiving unit 213 of the video information providing host 208 receives the designated video information type <505>, the various-operations receiving unit 213 sends the designated video information type <505> to the video information editing unit 211. The video information editing unit 211 searches the operation history information file 212 in order to check to see if an operation history information corresponding to the selected video information exists. In this case, the video information editing unit 211 searches the operation history information file 212 having the data structure shown in FIGS. 3 and 4 for the content of operation history information 307*a* (307*b*) corresponding to the video information ID 301*a* (301*b*) for the video information designated by the designated video information type <505> and corresponding to each sequential No. 303*a* (303*b*) for the user ID 302*a* (302*b*) of the user terminal 200 that sent the designated video information type <505>. For example, in FIG. 4, when the user "OHSAWA" with the user ID 302*a* (302*b*) inputs "EDUCATION01" with the video information ID 301*a* (301*b*) on the user terminal 200, the video information editing unit 211 searches the operation history information file 212 for operation history information 401 (402). At the same time, the video information editing unit 211 searches the operation history information file 212 for the contents of the operation history information 307*a* (307*b*) of which the other ID reference flag 304*a* (304*b*) is ON for each sequential No. 303*a* (303*b*) corresponding to the video and corresponding to the user ID 302*a* (302*b*) other than the user ID (302*a* or 302*b*) corresponding to the user terminal 200 transmitting the designated video information type <505>. For example, in FIG. 4, when the user "OHSAWA" with the user ID 302*a* (302*b*) inputs "EDUCATION01" with the video information ID 301*a* (301*b*) on the user terminal 200, the video information editing unit 211 searches the operation history information file 212 for the operation history information 403 of which "EDUCATION01" is the video information ID 301*a* (301*b*) and "REFERENCE" is ON.

As a result of the searching process, when the video information editing unit 211 finds the contents of the relevant operation history information 307*a* (307*b*), it sends a list of the operation history information to the user terminal 200 at step <506>. Thus, the user of the user terminal 200 is asked whether or not to use the operation history information. When the user wants to use the operation history information, he or she is prompted to input a sequential No. 303*a* (303*b*) and any combination of the user ID sets 302*a* (302*b*) in the list. When the user operates the various-operations input unit 206 of the user terminal 200 for designating a sequential No. 303*a* (303*b*) and a user ID set 302*a* (302*b*), the various-operations sending unit 207 of the user terminal 200 sends the designated information <507> to the video information providing host 208.

After the user designates a sequential No. 303*a* (303*b*) or the like and the various-operations receiving unit 213 of the video information providing host 208 receives the designated information <507>, the various-operations receiving unit 213 sends the designated information to the video information editing unit 211. The video information editing unit 211 reads video information designated by the designated video information type <505> from the video database 209 at step <508>. In addition, the video information editing unit 211 reads the contents of operation history information 307*a* (307*b*) corresponding to the video information ID 301*a* (301*b*) for the video information and corresponding to the user ID 302*a* (302*b*) and the sequential No. 303*a* (303*b*) designated as the designated information at step <507> from the operation history information file 212 at step <509>, and edits the video information corresponding to the contents of the operation history information 307*a* (307*b*). The edited video information is sent to a relevant user terminal 200 through the video information sending unit 210 and the transmission line 215 at step <510>. Thus, the edited video information is displayed on the user terminal 200.

In the case that the operation history information 401 to 403 shown in FIG. 4 is displayed on the user terminal 200, when the user inputs a command for using the operation history information 401 to 403 and inputs "001" as the sequential No. 303*a* (303*b*) and "OHSAWA" as the user ID 302*a* (302*b*), the video information editing unit 211 edits the video information corresponding to the operation history information 401.

Thus, the video information editing unit 211 sends to the user terminal 200 through the transmission line 215 the video information of which a fast-forward playback operation is performed for the portion from 0 min. 0 sec. to 1 min. 22 sec, a normal playback operation is performed for the portion from 1 min. 22 sec. to 10 min. 44 sec, a slow-playback operation is performed for the portion from 10 min. 44 sec. to 10 min. 55 sec, a pause operation is performed for the portion at 10 min. 55 sec, a rewind operation is performed for the portion from 10 min. 55 sec. to 10 min. 30 sec, and a stop operation is performed at the portion of 10 min. 30 sec.

On the other hand, when the user does not designate the use of the operation history information, the video information editing unit 211 reads the video information designated by the designated video information type <505> from the video database 209 at step <508> and successively sends the video information from the beginning to the video information sending unit 210.

While the video information corresponding to the operation history information is being displayed, when the user operates the various-operations input unit 206 of the user terminal 200 for designating various operations such as a fast-forward operation or a rewind operation, the various-operations sending unit 207 of the user terminal 200 sends designated information <512> to the video information providing host 208. The designated information signal is received by the various-operations receiving unit 213 of the video information providing host 208 and then sent to the video information editing unit 211. When the video information editing unit 211 receives the designated information, it references the manual operation priority flag 305*a* (305*b*) that has been set corresponding to the contents of operation history information 307*a* (307*b*) that is being processed. When the manual operation priority flag 305*a* (305*b*) represents that the playback operation of the video information has a higher priority the video information editing unit 211 executes the editing process corresponding to the designated information <512> for the video information that is being played back. For example, while the video information is being displayed corresponding to the operation history information 401 shown in FIG. 4, when the user performs such as a manual fast-forward operation or a manual rewind operation, since the manual operation priority flag 305a (305b) is ON, the manual fast-forward operation or the manual rewind operation is performed in the editing process.

On the other hand, when the manual operation priority flag 305a (305b) represents that the playback operation of the video information corresponding to the operation history information file 212 has a higher priority than the manual playback operation, the video information editing unit 211 ignores the designated information <512>. For example, while the video information is being displayed corresponding to the operation history information 402 shown in FIG. 4, if a user performs a manual fast-forward operation, a manual rewind operation, or the like, since the manual operation priority flag is OFF, the manual fast-forward operation, the manual rewind operation, or the like is ignored in the editing process.

In addition, while video information that does not correspond to the above-described operation history information is being displayed, when the user operates the various-operations input unit 206 of the user terminal 200 for designating such as a fast-forward operation or a rewind operation, the video information editing unit 211 executes the editing process corresponding to the designated information <512> for the video information that is being played back.

Moreover, the video information editing unit 211 successively records positions (time) and operations (for example, a normal playback operation, a fast-forward operation, a rewind operation, a stop operation, and a pause operation) performed for video information regardless of the above-described operation history information, as a new content of operation history information.

When the video information editing unit 211 receives a video transmission end request <513> from the user terminal 200, the video information editing unit 211 ends the transmission of the video information and sends to the user terminal 200 a history information storage inquiry <514> for inquiring whether or not to store the new contents of the operation history information sequentially recorded inside 307a (307b). Further, when the user operates the various-operations input unit 206 of the user terminal 200 for designating a storage request (sequential No. 302a (302b)), the request is sent to the video information editing unit 211 through the various-operations sending unit 207 of the user terminal 200, the transmission line 215, and the various-operations receiving unit 213 of the video information providing host 208 at step <515>. When the video information editing unit 211 receives the storage request <515>, it writes the new contents of the operation history information 307a (307b) sequentially recorded inside to a record position of the operation history information file 212 corresponding to the sequential No. 303a (303b) designated as the storage request <515>.

According to the first embodiment, when a user receives video information that he or she accessed before and performs the same operations as before (for example, when a teacher gives a particular lecture to a particular audience with the same educational video information that has been used for another audience), the user can play back the educational video information with the same method as in the previous time without performing the same operations that he or she performed before.

In addition, according to the first embodiment, when a user references video information that another user accessed before, corresponding to the operation history information thereof (for example, when the same group members reference research video information or when a teacher analyzes what portion of educational video information students saw), the operation history information of other users can be easily reproduced/checked.

According to the first embodiment, since the operation history information is composed in a file format of which a user can edit with an editor or the like, he or she can easily edit/process video information.

According to the first embodiment, since a plurality of patterns of an operation history for particular video information can be provided for a user, by designating a sequential number which identify a pattern, the user can reference a plurality of pieces of operation history information of which one piece of video information has been edited/processed. As a result, when the same video source is used for different audiences with different emphasized points, the operability is improved and the video source can be flexibly used.

Since operation histories for a plurality of users for particular video information are provided, for example a teacher can compare/analyze operations performed by a plurality of students for educational video information (more reality, portions in which the students were interested or portions that they skipped with a fast-forward operation).

When a manual interrupt operation can be enabled while video information corresponding to an operation history is being played back, other operations that are not sufficient by the operation history can be performed. In addition, the operation history can be slightly adjusted.

When a user wants to prohibit other users from referring operation history information of the user, the history information that the user wants to leave unchanged can be kept secret.

Second Embodiment

Figure 6:
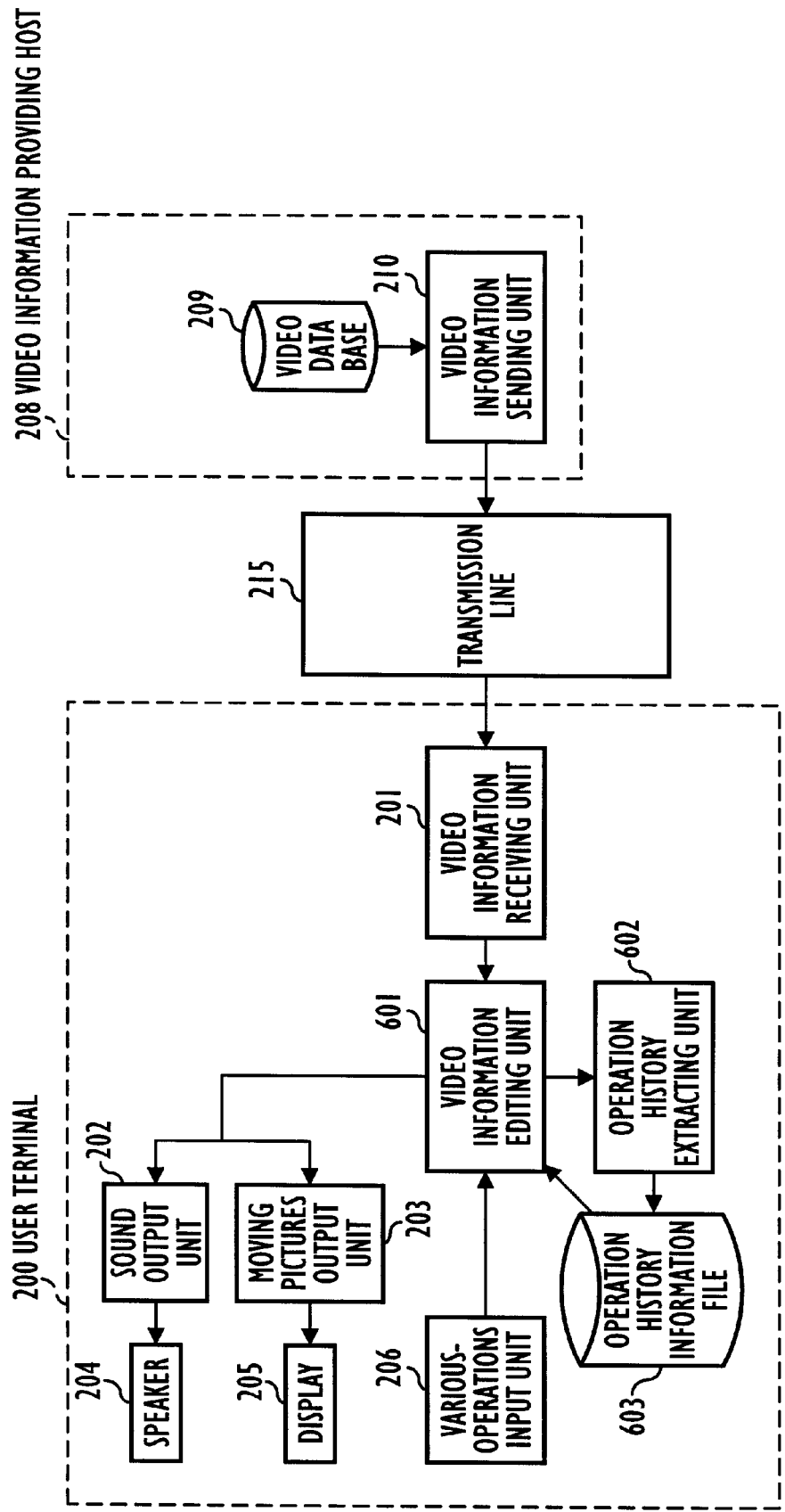
FIG. 6 is a block diagram showing a construction according to a second embodiment of the present invention (in the case that a user terminal side has an operation history)

FIG. 6 is a block diagram showing a construction of a second embodiment of the present invention. The difference between the construction of the second embodiment and the construction of the first embodiment shown in FIG. 2 is in that the video information editing unit 211, the operation history information file 212, and the operation history extracting unit 214 in the video information providing host 208 shown in FIG. 2, are composed of a video information editing unit 601, an operation history information file 603, and an operation history extracting unit 602 in a user terminal 200 shown in FIG. 6, respectively. As a feature of the present invention, in the user terminal 200, while the latest video information for a predetermined period of time is being buffered, it is independently edited.

The data structure of the operation history information file 603 of the second embodiment is the same as the data structure of the operation history information file 212 of the first embodiment, except that the user ID 302a (302b), the other ID reference flag 304a (304b), and the simultaneous transmission destination interrupt flag 306a (306b) are omitted.

Next, a real operation of the second embodiment will be described with reference to a flow chart shown in FIG. 7.

A user terminal 200 sends a connection request <701> to a video information providing host 208 through a transmission line 215. The video information providing host 208 sends back a response <702> corresponding to the request to the user terminal 200. Thus, a communication start state (connection state) <703> takes place.

Thereafter, a video information sending unit 210 of the video information providing host 208 sends to the user terminal 200 a video information type input inquiry <704> requesting the user terminal 200 for video information corresponding to index information of the video information of the video database 209. At this point, the user operates a various-operations input unit 206 of the user terminal 200 for designating a video information type. Thus, a video information type designation <705> is sent from a sending unit (not shown) of the user terminal 200 to the video information providing host 208.

The video information type designated by the user is sent to a receiving unit (not shown) of the video information providing host 208. Thereafter, the video information type is sent to a video information sending unit 210. The video information sending unit 210 reads the designated video information from the video database 209 and successively sends the video information to the user terminal 200 through the transmission line 215 at step <707>.

At this point, in addition to the video information type, the user operates the various-operations input unit 206 for designating the type of the video information and, if necessary, a sequential number 303a (303b) at step <706>. The designated information is sent to a video information editing unit 601 of the user terminal 200.

The video information is sent from the video information providing host 208 to a video information receiving unit 201 of the user terminal 200. The latest video information for a predetermined period of time is stored in a buffer of the video information receiving unit 201 at step <708>.

The video information editing unit 601 reads the contents of operation history information 307a (307b) corresponding to video information ID 301a (301b) for the video information type designated by the user on the various-operations input unit 206 and corresponding to the sequential No. 303a (303b) designated by the user on the various-operations input unit 206 from the operation history information file 603 at step <709>. Thereafter, the video information editing unit 601 successively reads the latest video information for the predetermined period of time stored in the buffer of the video information receiving unit 201 according to the contents of operation history information and edits it. Video picture data and sound data corresponding to the edited video information are output on a display 205 and from a speaker 204 through a moving picture output unit 203 and a sound output unit 202, respectively, at step <710>.

The video information editing unit 601 successively records operations (such as a normal playback operation, a fast-forward operation, a rewind operation, a stop operation, and a pause operation) and positions (time) of video information regardless of the above-described operation history information, as a new content of operation history information 307a (307b) at step <711>.

While video information corresponding to the above-described operation history information is being displayed, when the user operates the variousoperations input unit 206 of the user terminal 200 for designating such as a fast-forward operation or a rewind operation, the designated information is sent to the video information editing unit 601 at step <712>. When the video information editing unit 601 receives the designated information, it references a manual operation priority flag 305a (305b) that is set corresponding to the content of operation history information 307a (307b) that is being processed. When the manual operation priority flag 305a (305b) represents that the manual playback operation of the video information has a higher priority than the playback operation corresponding to the operation history information file 603, the video information editing unit 601 executes the editing process corresponding to the information designated <712> for the video information that is being played back, and outputs the edited video information at step <713>. The video information editing unit 601 successively records these operations as the new contents of operation history information 307a (307b) at step <717>.

On the other hand, when the manual operation priority flag 307a (307b) represents that the playback operation of the video information corresponding to the operation history information file 603 has a higher priority than the manual playback operation, the video information editing unit 601 ignores the designated information <712>.

While video information that does not correspond to the above-described operation history information is being displayed, when the user operates the various-operation input unit 206 of the user terminal 200 for designating various operations such as a fastforward operation or a rewind operation, the video information editing unit 601 executes the editing process corresponding to the designated information <712> for the video information that is being played back. The video information editing unit 601 successively records these operations as the new contents of operation history information 307a (307b) at step <717>.

When the video information editing unit 601 receives an end request <714> from the various-operations input unit 206 at step <714>, the video information editing unit 601 sends the request as a video transmission end request <714> from a sending unit (not shown) to a video information providing host 208 forward the transmission line 215.

When the video information sending unit 210 of the video information providing host 208 receives the video transmission end request <714> from the user terminal 200, the video information sending unit 210 ends the transmission of the video information and disconnects the communication path at step <715>.

On the other hand, the video information editing unit 601 of the user terminal 200 outputs on a display 205 an inquiry as to whether or not to store the new contents of the operation history information 307a (307b) that is successively being recorded. When the user designates a sequential No. 303a (303b) for storing the contents of operation history information 307a (307b) on the various-operations input unit 206 of the user terminal 200, the video information editing unit 601 writes the new contents of operation history information 307a (307b) that is being successively recorded to a record position in the operation history information file 603 corresponding to the designated sequential No. 303a (303b) of the operation history information.

According to the second embodiment, since various operations (a fast-forward operation, a rewind operation, a slow-playback operation, and so forth) are performed for video information received on a user terminal 200 side corresponding to the operation history information thereon, the loads on the video information providing host 208 side and the transmission line 215 side can be reduced.

Third Embodiment

Next, a third embodiment of the present invention will be described. The construction of the third embodiment is the same as the construction of the second embodiment shown in FIG. 6.

As a feature of the present invention, in the third embodiment, video information designated by a user terminal 200 is sent from a video information providing host 208 to the user terminal 200 on a batch basis, and the video information is uniquely edited.

Next, a real operation of the third embodiment will be described with reference to a flow chart shown in FIG. 8.

Figure 7:
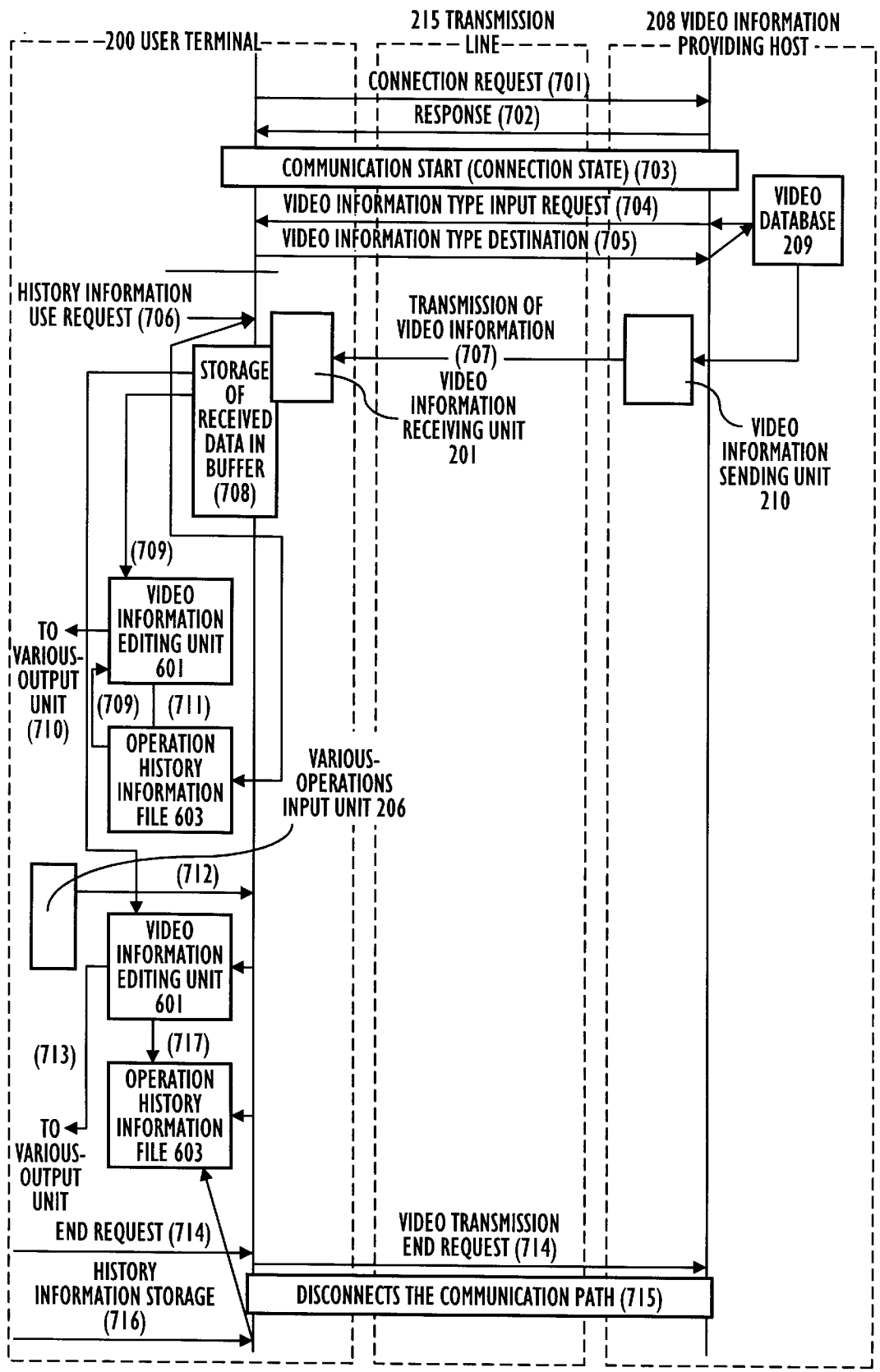
FIG. 7 is an operating flow chart according to the second embodiment.

Steps <701> to <705> of the second embodiment shown in FIG. 7 are applied to the third embodiment unchanged.

Figure 8:
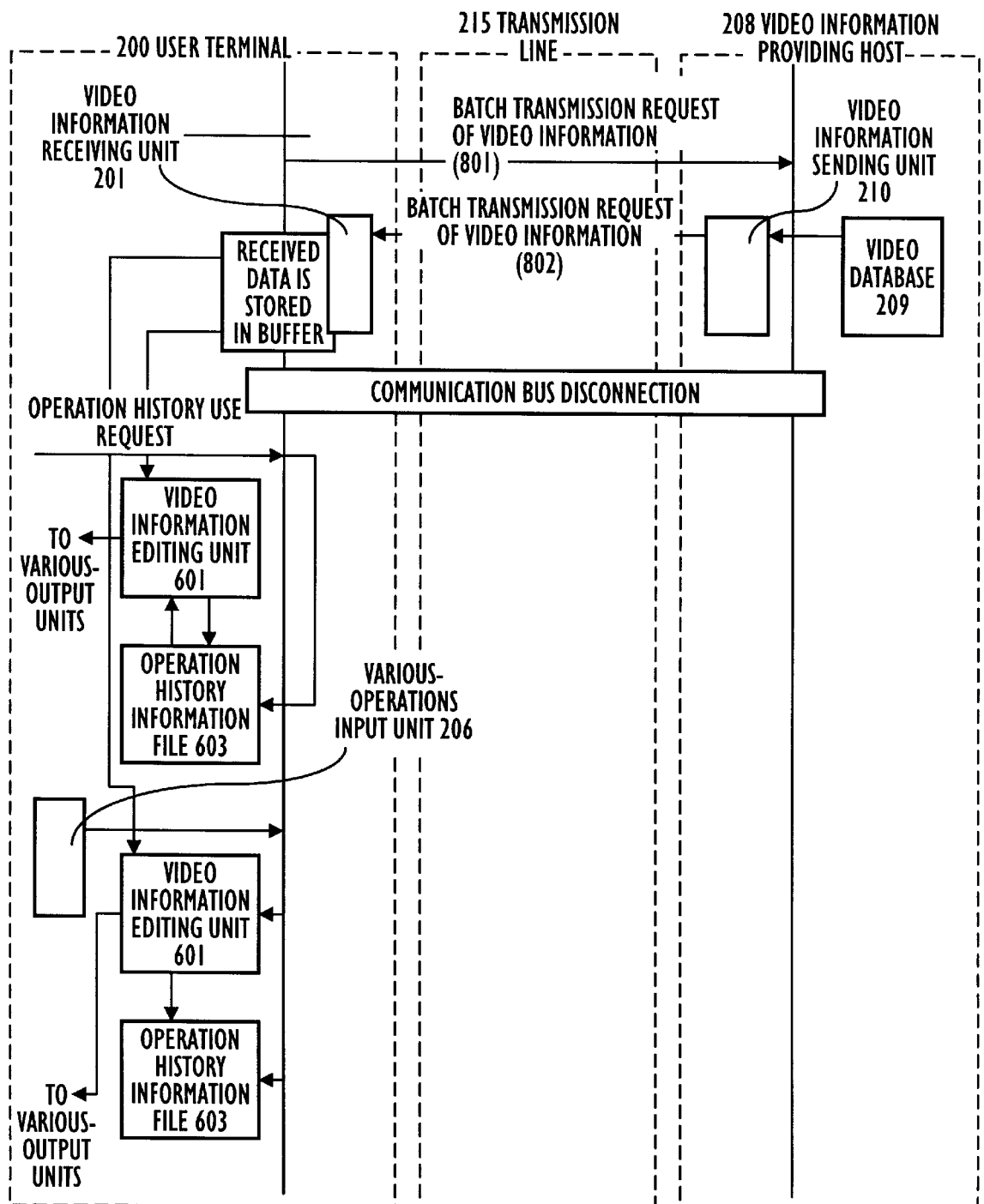
FIG. 8 is an operating flow chart according to the third embodiment.

Thereafter, in FIG. 8, the user designates a batch transmission request for video data on a various-operations input unit 206. This request is sent from a sending unit (not shown) to a video information providing host 208 through a transmission line 215 at step <801>.

When a video information sending unit 210 of the video information providing host 208 receives the batch transmission request at step <801>, the video information sending unit 210 reads designated video information from a video database 209 and sends the video information to the user terminal 200 through the transmission line 215 on a batch basis at step <802>.

The video information transmitted from the video information providing host 208 is received on a batch basis by a video information receiving unit 201 of the user terminal 200 and stored in a buffer thereof.

After the video information is sent on a batch basis at step <802>, a channel of the transmission line 215 between the user terminal 200 and the video information providing host 208 is disconnected.

The other steps performed in the editing process for the video information performed by the user terminal 200 are the same as steps after step <706> of the second embodiment, except for steps <714> and <715>.

According to the third embodiment, since video information to be received on the user terminal side is sent to the user terminal 200 on a batch basis, various operations (such as a fast-forward operation, a rewind operation, and a slow-playback operation) are performed for the video information corresponding to the operation history information on the user terminal 200 side, the loads on the video information providing host 208 side and the transmission line 215 side can be reduced.

Fourth Embodiment

Next, a fourth embodiment of the present invention will be described. The construction of the fourth embodiment is the same as the construction of the first embodiment shown in FIG. 2.

As a feature of the present invention, in the fourth embodiment, while video information that is read from a video database 209 of a video information providing host 208 is being edited corresponding to the contents of a particular operation history information 307a (307b) of an operation history information file 212, the video information is simultaneously transmitted to a plurality of user terminals 200.

Next, a real operation of the fourth embodiment will be described with reference to a flow chart shown in FIG. 9.

Figure 5:
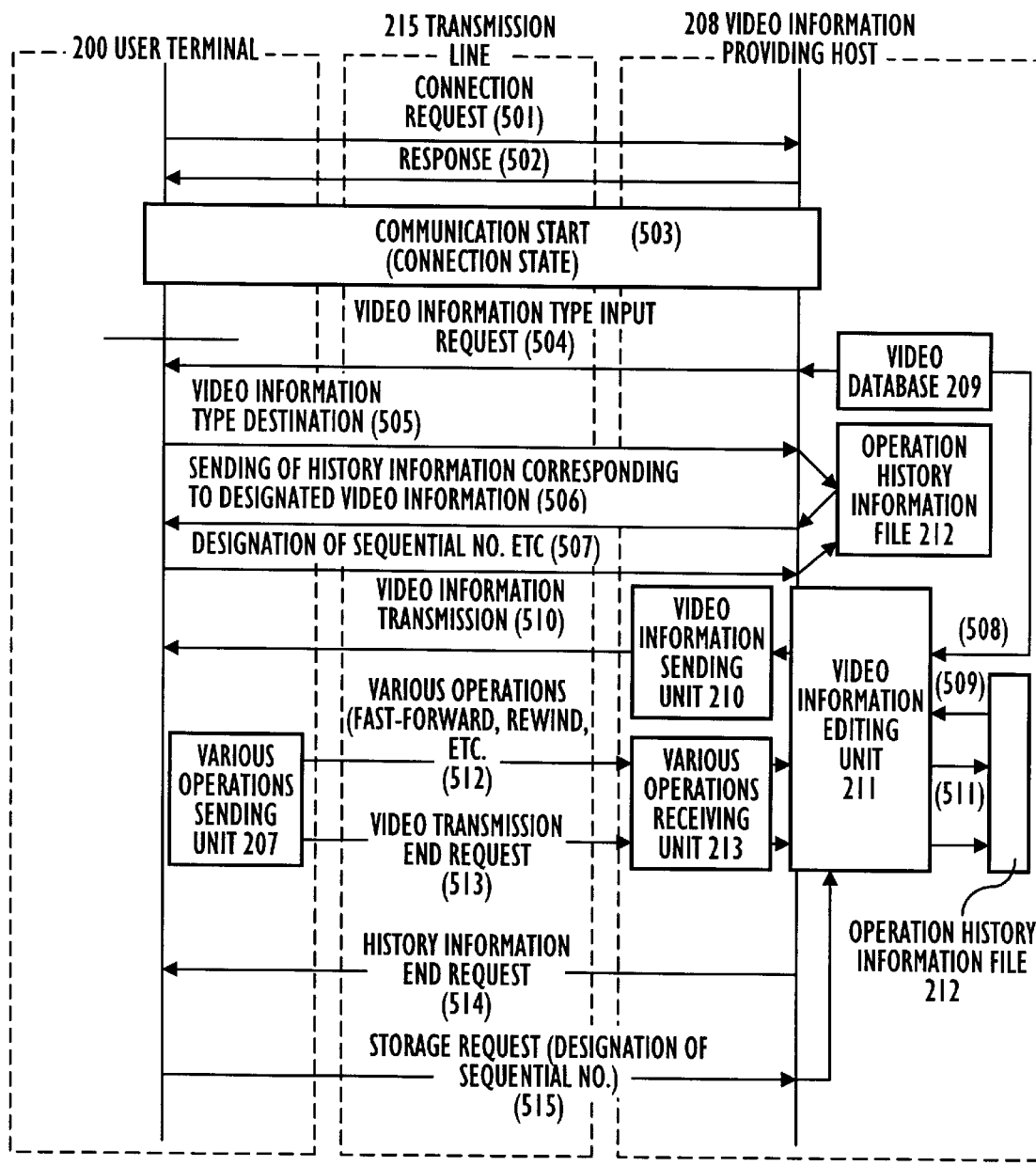
FIG. 5 is an operating flow chart according to the first embodiment.

Steps <501> to <503> of the flow chart of the first embodiment shown in FIG. 5 are applied to the fourth embodiment unchanged.

Figure 9:
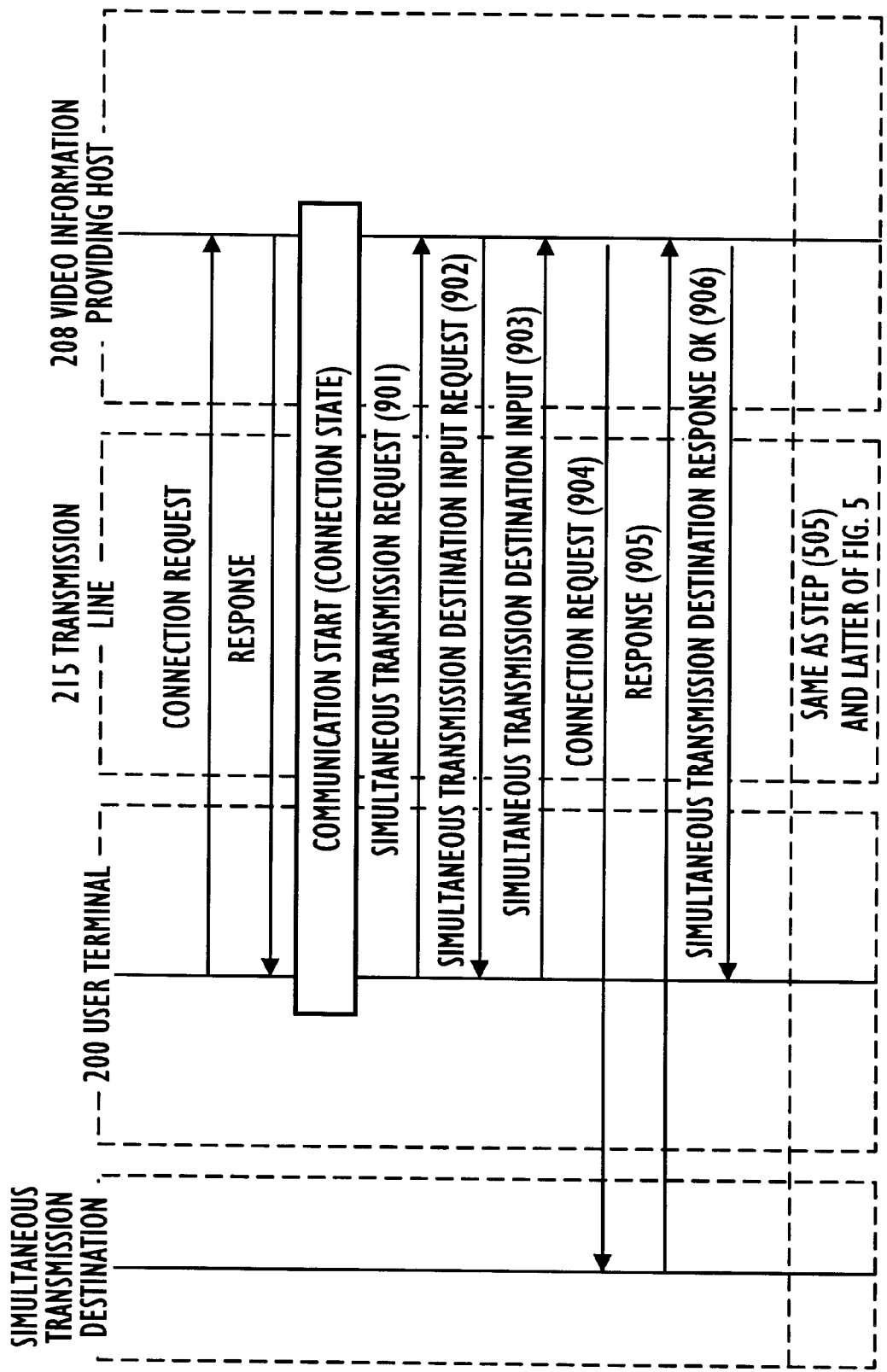
FIG. 9 is an operating flow chart according to the fourth embodiment.
Figure 10:
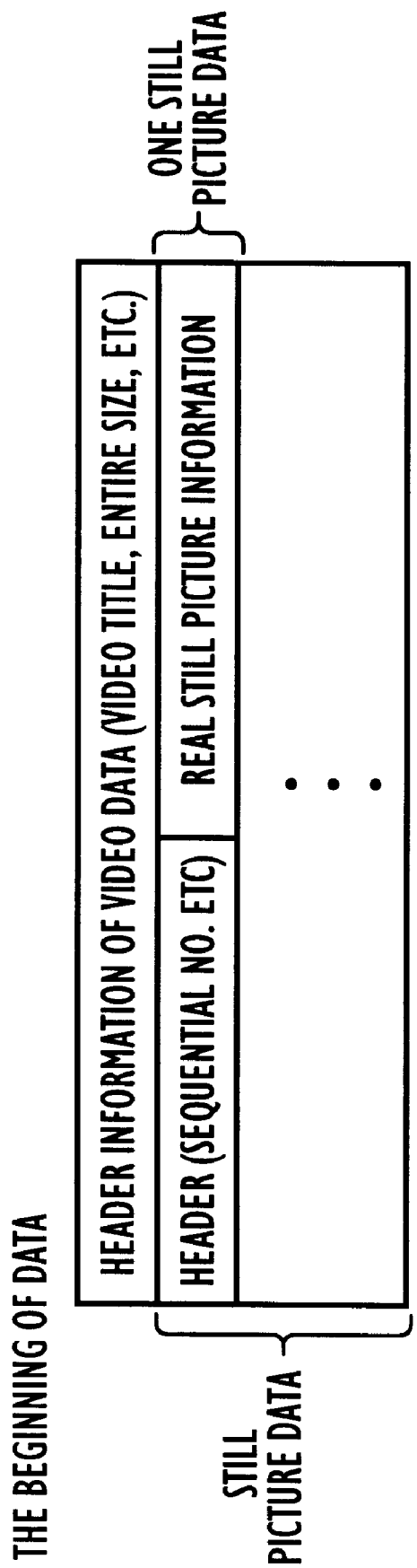
FIG. 10 shows a structure of a video information file included in a video database.

In FIG. 9, a user of a particular user terminal 200 designates a simultaneous transmission request for video information on a various-operations input unit 206. This request is sent from a various-operations sending unit 207 to the video information providing host 208 through a transmission line 215 at step <901>.

When a video information sending unit 210 of the video information providing host 208 receives the simultaneous transmission request of step <901> through a various-operations receiving unit 213, the video information sending unit 210 sends a simultaneous transmission destination input request to the particular user terminal 200 through the transmission line 215 at step <902>. A display 205 of the relevant user terminal 200 displays a request for inputting a simultaneous transmission destination.

When the user designates a simultaneous transmission destination address (address information corresponding to the type of the transmission line 215 such as terminal ID and telephone No.) on the various-operations input unit 206, the designated information is sent from the various-operations sending unit 207 to the video information providing host 208 through the transmission line 215 at step <903>.

When the video information sending unit 210 of the video information providing host 208 receives the simultaneous transmission designated destination addresses from the particular user terminal 200, the video information sending unit 210 sends a connection request to all user terminals 200 designated as the simultaneous transmission destinations corresponding to the addresses, through the transmission line 215 at step <904>.

When a user terminal 200, designated as a simultaneous transmission destination, sends back a response to the video information sending unit 210 of the video information providing host 208, the video information sending unit 210 sends a simultaneous transmission destination response OK message to the particular user terminal 200 through the transmission line 215 at step <906>.

Thereafter, similar steps to steps <505> to <507> of the first embodiment are executed between the video information providing host 208 and the particular user terminal 200.

Thereafter, the video information editing unit 211 reads the contents of operation history information 307a (307b) designated by the particular user terminal 200 from the operation history information file 212, edits the video information read from the video database 209, and simultaneously sends the edited information to all the user terminals 200 designated as simultaneous transmission destinations.

While video information corresponding to the above-described operation history information is being displayed, when a particular user operates the various-operations input unit 206 of the user terminal 200 for designating such as a fast-forward operation or a rewind operation, as with step <512> shown in FIG. 5, the various-operations sending unit 207 of the particular user terminal 200 sends designated information to the video information providing host 208 at step <512>. After the various-operation receiving unit 213 of the video information providing host 208 receives the designated information at step <512>, the designated information is sent to the video information editing unit 211. When the video information editing unit 211 receives the designated information, it references a manual operation priority flag 305a (305b) that is set corresponding to the contents of the operation history information 307a (307b) that is being processed. When the manual operation priority flag 305a (305b) represents that the manual playback operation for the video information has a higher priority than the playback operation corresponding to an operation history information file, the video information editing unit 211 executes the editing process corresponding to the designated information for the video information that is being played back.

While video information corresponding to the above-described operation history information is being displayed, when a user as a simultaneous transmission destination operates the various-operations input unit 206 of the user terminal 200 for designating such as a fast-forward operation or a rewind operation, a similar step to step <512> shown in FIG. 5 is performed. In this case, the video information editing unit 211 references a simultaneous transmission destination interrupt flag 306a (306b) as well as the manual operation priority flag 305a (305b) that is set corresponding to the contents of operation history information 307a (307b) that is being processed. When the manual operation priority flag 305a (305b) represents that the manual playback operation for the video information has a higher priority than the playback operation corresponding to the operation history information file, and the simultaneous transmission destination interrupt flag 306a (306b) represents that an interrupt from a simultaneous transmission destination is permitted, the video information editing unit 211 performs the editing process corresponding to the designated information for the video information that is being played back.

While video information is being displayed corresponding to the operation history information 401 shown in FIG. 4, when a user as a simultaneous transmission destination performs a manual fast-forward operation or a manual rewind operation, since the manual operation priority flag 305a (305b) and the simultaneous transmission destination interrupt flag 306a (306b) are ON, the manual fast-forward operation or the manual rewind operation of the user as a simultaneous transmission destination are performed in the editing process. On the other hand, while video information is being displayed corresponding to the operation history information 402 (403) shown in FIG. 4, when a user as a simultaneous transmission destination performs a manual fast-forward operation or a manual rewind operation, since the simultaneous transmission destination interrupt flag 306a (306b) is OFF, the manual fast-forward operation or the manual rewind operation performed by the user as a simultaneous transmission destination is ignored in the editing process. Since the manual operation priority flag 305a (305b) of the operation history information 403 shown in FIG. 4 is ON, the manual fast-forward operation or the manual rewind operation of a calling user is not ignored in the editing process.

According to the fourth embodiment, since video information can be simultaneously transmitted corresponding to particular operation history information, the operability for a conference system held among a plurality of remote locations and the like can be improved.

In the case that video information is simultaneously transmitted, since an interrupt from a user terminal 200 on a called side as a simultaneous transmission destination can be controlled, whether to perform a batch control on a calling side (a particular user terminal 200 that has accessed the video information providing host 208 for the first time can be controlled).

Other Embodiments

In the above-described embodiments, there are two methods by which all of the various operations for video information are stored or not stored. It should be noted that a history of particular operations for which video information is being played back can be selectively removed.

In the above-described embodiments, the user ID 302a (302b) included in the operation history information file 212 accords with the user terminal 200. However, a user ID 302a (302b) may be designated for each user who uses the same user terminal 200.

Provided next is the explanation about the embodiment where each of processing units and functions is implemented on a personal computer (running under Windows, etc.).

A various-operations receiving unit 213 receives an interrupt message of pressing a key assigned to a PF key on a keyboard for various playback devices (For Windows, if a key pressing event occurs as a system interrupt, a message of pressing a key is issued to an application; A Windows standard message is used), and transmits a message of operation contents (internally defined message) to a video information editing unit 211.

The video information editing unit 211 performs two procedures such as a video playback method determining procedure and a video information address managing procedure.

The video playback method determining procedure determines a current playback device according to an interrupt of any of various playback devices transmitted from the various-operations receiving unit 213 and operation history information received from an operation history information file 212, and passes a message to a video information output control unit 210a.

The video information address managing procedure manages an elapse time from the beginning of a video database 209 (which is calculated based on a system time obtained from a personal computer), and addresses included in the video database 209 of a still picture file being displayed (physical addresses of a corresponding still picture file stored onto a hard disk, the number of frames assigned from the first still picture information included in still picture information within the video database 209, etc.). If the video playback method is changed by the video playback method determining procedure, this procedure writes address information and the playback method to an operation history information file 212.

A video information output control unit 210a performs an output control of picture information (still picture information) from a video database 209, according to a playback method instructed by the video playback method determining procedure (operations such as a fast forward operation, a slow playback operations, etc. are controlled by changing the number of still pictures displayed for one second).

The video database 209 stores still picture information at an interval of a 1/30 second. For a normal playback, 30 frames of still picture data are displayed on a screen for one second (one frame of data is displayed every 1/30 second). For a slow playback at a ½-time speed, 15 frames of the still picture data are displayed on the screen for one second (one frame is displayed every 1/15 second). For a fast forward playback at a two-times speed, 30 frames (every other frame) are selected from continuous 60 frames of the still picture data, and displayed for one second. For a rewind, sequential numbers of header information included in each of still picture data are retroactively displayed.

According to the above described mechanism, continuous still pictures are displayed for a predetermined period and reproduced as moving pictures.

A structure of video data included in the video database 209 possesses header information indicating a video title and a total size at the beginning of the data. Each piece of still picture data is composed of a header indicating a sequential number and still picture information.

Figure 11:
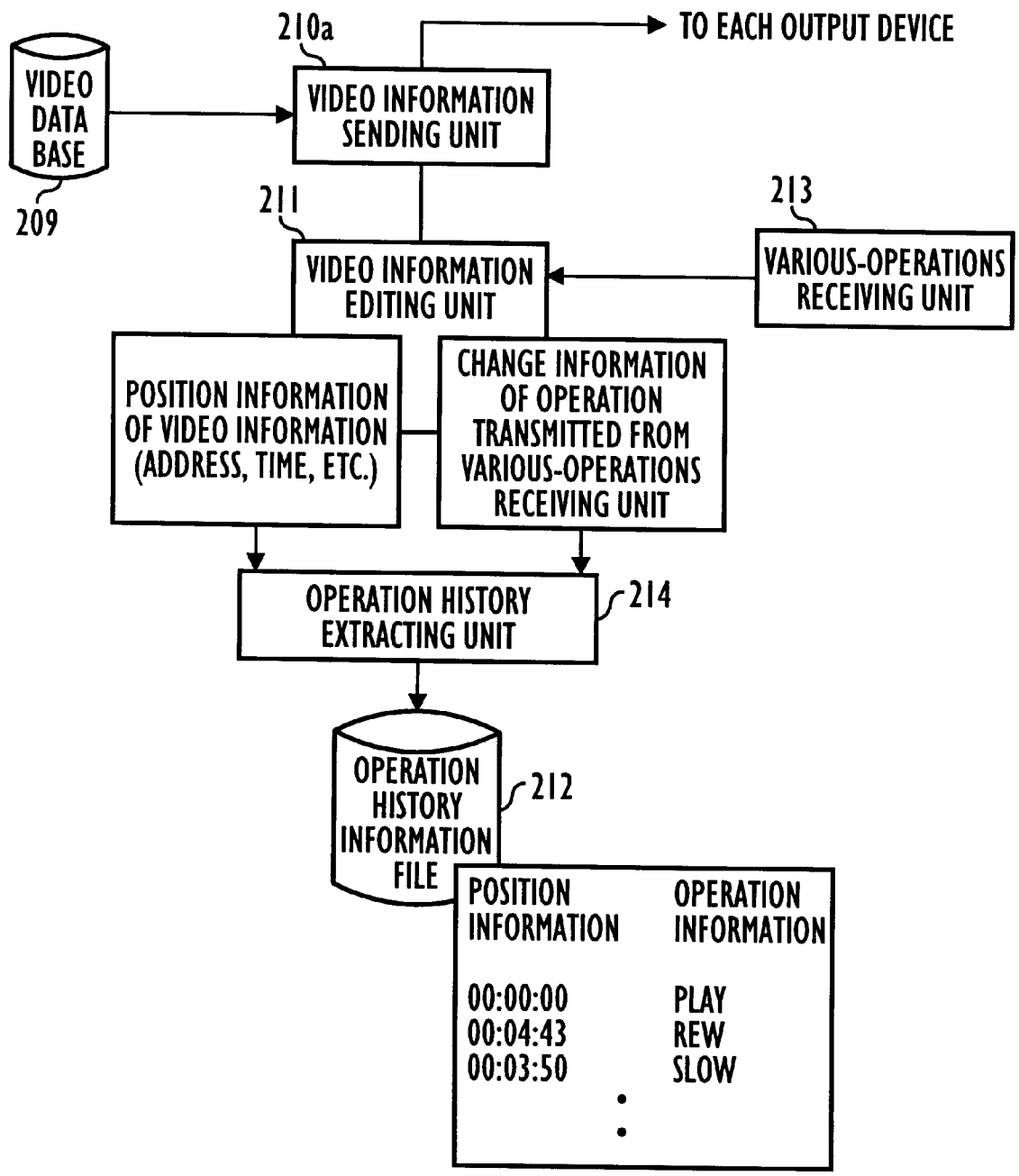
FIG. 11 is a block diagram showing a storing process of operation history information.

FIG. 11 is a block diagram showing a relationship between video data included in a video database 209 and operation history information.

In this figure, if the contents of an operation transmitted from a various-operations receiving unit 213 (such as a normal playback operation, fast forward operation, etc.) changes, position information about video data being displayed from the video database 209 (such as an address in the database 209, an elapse time from the beginning, etc.), and changed contents of the operation is transmitted to an operation history extracting unit 214, and stored in an operation history information file 212.

Figure 12:
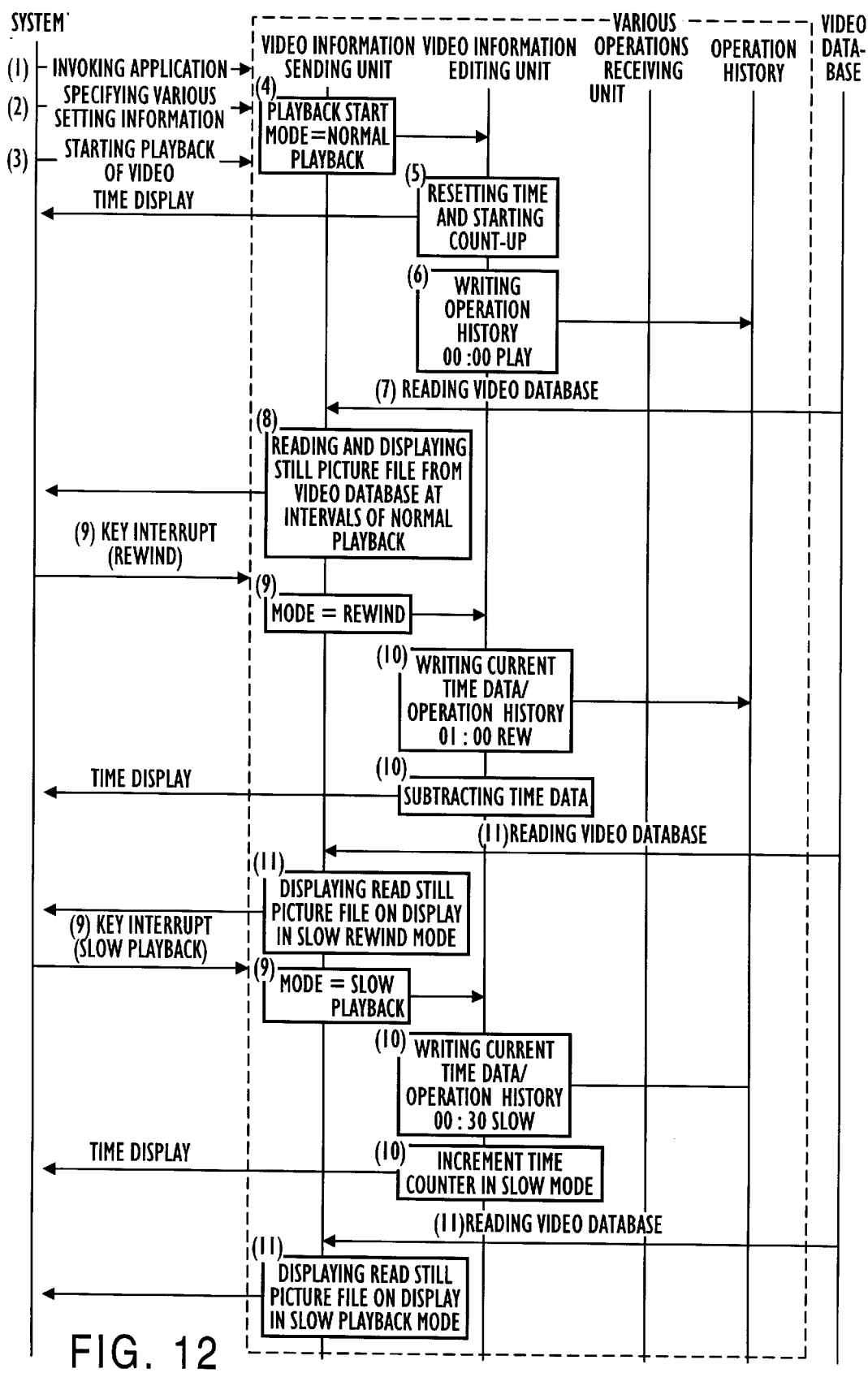
FIG. 12 is a sequence table of the storing process of the operation history information.

FIG. 12 is a sequence table of a storing process of an operation history.

For the system shown in FIG. 12, a Windows application running on a personal computer is assumed.

The operation history is stored in a file stored onto a hard disk of a personal computer. A video database corresponds to a database stored onto a hard disk of a video information providing host 208 connected to a user terminal 200 via a transmission line 215 such as a LAN, etc.

Provided below is the explanation about a case where a user terminal 200 (personal computer) shown in FIG. 6 possesses an operation history.

(1) Invokes an application using the operation history from a system.

(2) Provides various setting information (such as information about whether to store the operation history, whether to acknowledge a manual operation interrupt from a keyboard, etc.) from an I/O device such as a display unit, keyboard, mouse, etc. (This information may be set each time an application using the operation history is invoked, or implemented by referencing a file stored as an initialization file.

(3) Instructs a playback of a video selected from a video list displayed on a screen.

(4) A video information output control unit 210*a* received the (3) playback instruction sets a playback mode to a normal playback, and transmits a playback start message to a video information editing unit 211.

(5) The video information editing unit 211 received the (4) message resets a time counter to 00:00:00, increments every second, and displays an elapse time on an output device such as a display unit depending on need.

(6) The video information editing unit 211 writes the contents of (4) and (5) "00:00:00 PLAY" to an operation history file 212.

(7) After (4) through (6) are processed, the video database 209 stored in the video information providing host 208 is read via a transmission line 215 such as a LAN, etc.

(8) The video information output control unit 210*a* outputs the video information (a plurality of pieces of still image information) read in (7) to an output device such as a display unit, etc. in a current playback mode (the normal playback mode set in (4)).

(9) If an entry of changing the playback mode (such as pressing a function key on a keyboard, clicking a button on a screen by a mouse, etc.) is made via an input device such as a keyboard, a mouse, etc. (pressing a function key on a keyboard is made, clicking a button on a display screen with a mouse, etc.), the video information output control unit 210*a* changes a value of the playback mode to an instructed value (a rewind mode at this time), and transmits a message indicating the change of the playback mode to the video information editing unit 211.

(10) The video information editing unit 211 writes a current value of the time counter and the changed value of the playback mode received in (9) to the operation history file 212, and changes a count-up method of time data (if the value indicates a rewind, the time counter value is decremented by 1 every second. Or, if the value indicates a fast forward, the time counter is incremented by 2 every second (in a case of two-times speed), etc.)

(11) The video information output control unit 210*a* outputs the video database 209 being read from the video information providing host 208 to the output device such as a display unit, etc. in a playback mode specified by Step (9). Then, the above described steps (9) through (11) are repeated.

Figure 13:
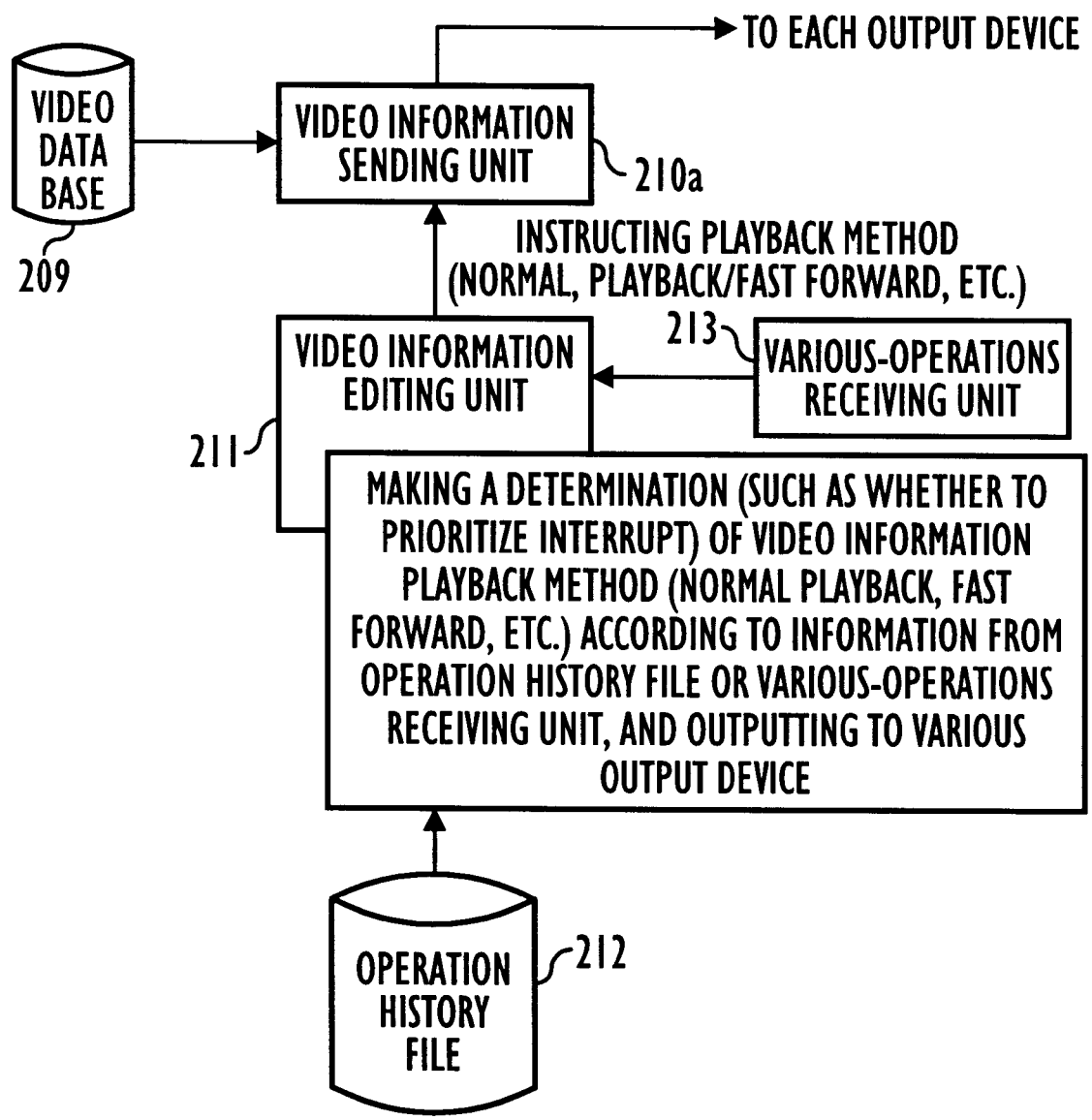
FIG. 13 is a block diagram showing a playback process using the operation history information.

FIG. 13 is a block diagram showing a playback process using operation history information.

A video information editing unit 211 receives video playback information (a normal playback, a fast forward, etc.) from an operation history file 212 and a various-operations receiving unit 213, determines a playback method of video information based on each condition (such as a condition of whether to prioritize a manual operation, etc.), and instructs a video information output control unit 210*a* to use which output method.

Figure 14:
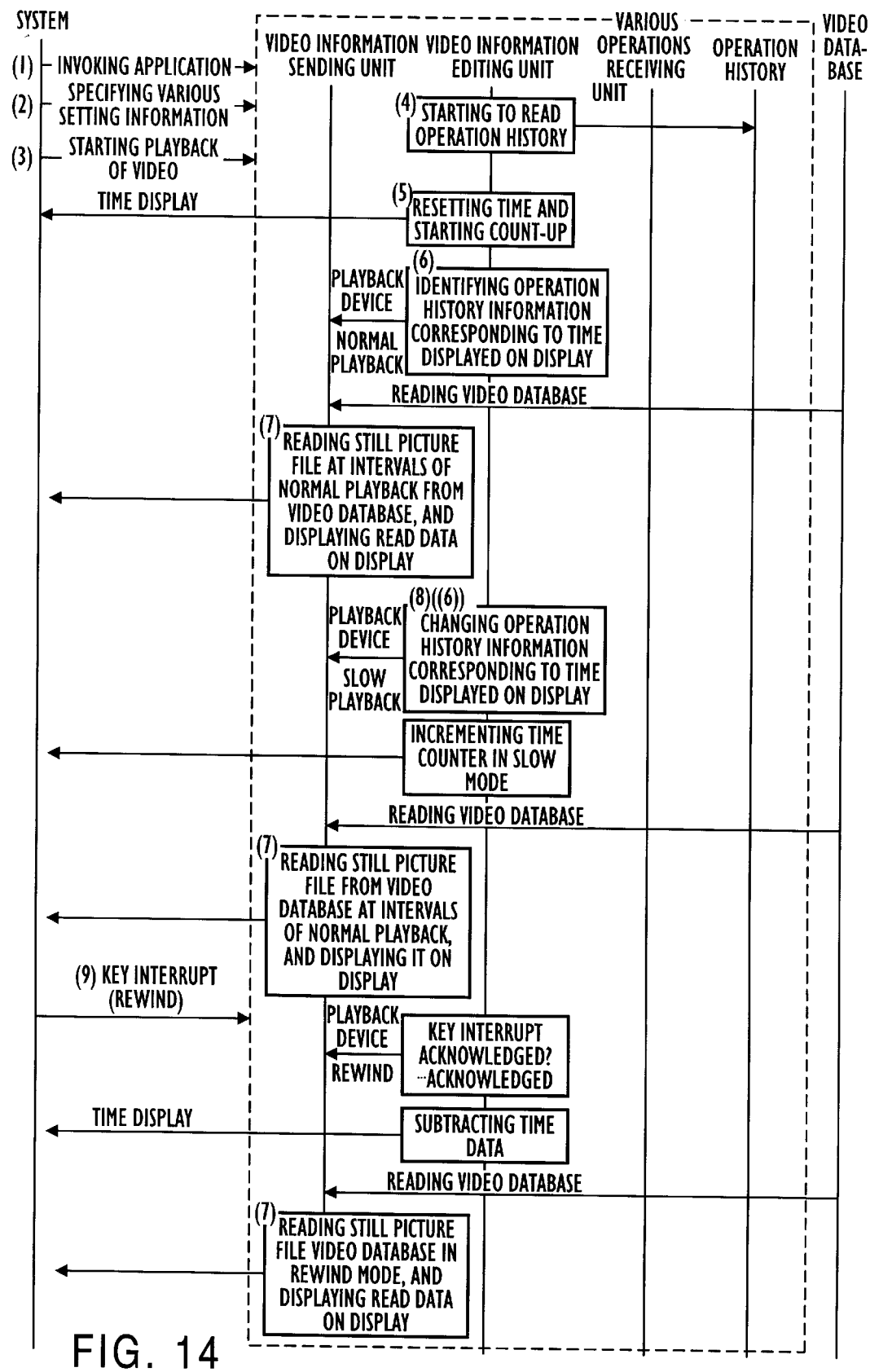
FIG. 14 is a sequence table of the playback process using the operation history information.

FIG. 14 shows a sequence table of a playback process of video information by referencing an operation history. An assumed system is the same as that of the process shown in FIG. 12.

(1) Invokes an application using the operation history from the system.

(2) Instructs various setting information (information about whether to reference the operation history, whether to acknowledge a manual operation interrupt from the keyboard, etc.) via an I/O device such as a display unit, a keyboard, a mouse, etc. (This information may be set each time an application using the operation history is invoked, or implemented by referencing a file stored as an initialization file).

(3) Instructs a playback of a video selected from a video list displayed on a screen.

(4) If an instruction of a playback using the operation history is given according to the various setting information (2), a video information editing unit 211 reads operation history information from an operation history file 212, while a video information output control unit 210*a* reads video information from a video database 209.

(5) After an instruction of starting a playback is given, the video information editing unit 211 resets a time counter to 00:00:00, increments the time counter by 1 every second, and instructs an output device such as a display unit, etc. to display time depending on need.

(6) The video information editing unit 211 determines a current playback mode according to the operation history read in (4) and the time counter started in (5), and transmits a message of a playback method to the video information output control unit 210*a*.

(7) The video information output control unit 210*a* outputs the video information read in (4) to the output device such as a display unit, etc. in the playback mode received in (6).

(8) The video information editing unit 211 performs the operations of (6) and (7) when the time counter reaches a playback method changing point in the operation history file 212 read in (4).

(9) If an interrupt instruction (such as pressing a function key on a keyboard, clicking a button on a screen by a mouse, etc.) of a playback method is given by the system, the video information editing unit 211 checks a manual operation interrupt flag according to the various setting information in (2), and transmits the instruction of the playback method to the video information output control unit 210*a* if an interrupt is acknowledged. Then, an output control is performed in a similar manner as in (7).

The operations of (8) and (9) are then repeated.

In the above described embodiment, the method for identifying the position information of the video information is explained. To identify this information using an address, header information included in each still picture data read from the video database is used.

If the video information providing host 208 shown in FIG. 2 stores the operation history, the system shown in FIGS. 12 and 14 corresponds to a user terminal 200, and the rest of the figures must be replaced with the video information providing host 208. Then, a message instructed by the system is transmitted to the video information providing host 208 via a transmission line 215 such as a LAN, etc.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A video information providing/receiving system where a user terminal instructs a video information providing host of various operations via a transmission line, and receives video information corresponding to the various operations from the video information providing host, the video information providing host comprising:

operation history information storing means for storing operation history information; and operation history information writing means for writing a history of the various operations corresponding to the video information received by the user terminal to said operation history information storing means as the operation history information, so as to allow the video information to be played back with operations the same as the various operations, while the video information providing host transmits the video information via the transmission line according to a request made by the user terminal.

2. The video information providing/receiving system as set forth in claim 1, wherein:

said operation history information writing means writes the operation history information to said operation history information storing means for each of a plurality of pieces of the video information, and for each user using the user terminal which accesses each piece of the video information or each user terminal which accesses each piece of the video information; and the video information providing host further comprising:
video information editing means for transmitting the video information to the user terminal operated by a user who makes the request while editing, based on the requested video information and the operation history information corresponding to the requested video information and the user who makes the request or the user terminal operated by the user, according to the instruction given by the user, when the user requests the video information providing host to transmit the video information from the user terminal, and when said operation history information storing means in the video information providing host stores the operation history information corresponding to the requested video information and the user who makes the request or the user terminal operated by the user.

3. The video information providing/receiving system as set forth in claim 2, wherein:

said video information editing means multicasts the requested video information to user terminals operated by a predetermined number of users while editing, based on the operation history information, which is stored in said operation history information storing means, corresponding to the requested video information and a specific user who makes the request or the user terminal operated by the specific user, according to an instruction given by the specific user.

4. The video information providing/receiving system as set forth in claim 3, wherein:

when said operation history information writing means writes the operation history information to said operation history information storing means, for each of the plurality of pieces of the video information, and for each user who accesses each piece of the video information or each user terminal operated by the user, said operation history information writing means determines whether or not said video information editing means permits the user at a multicasting destination to edit the video information according to an interrupt manually operated on the user terminal that the user uses;

when it is determined that said video information editing means permits the user to edit the video information, said video information editing means edits the video information according to the interrupt manually operated on the user terminal that the user uses at the multicasting destination, while editing the requested video information based on the operation history information.

5. The video information providing/receiving system as set forth in claim 1, wherein:

the operation history information stored in said operation history information storing means is text file data.

6. The video information providing/receiving system as set forth in claim 2, wherein:

said operation history information storing means stores the operation history information for each piece of the video information, for each user who accesses each piece of the video information or each user terminal operated by the user, and for each access made by the user or by the user terminal operated by the user; and said video information editing means edits the video information based on one piece of the operation history information corresponding to the requested video information, the user who makes the request or the user terminal operated by the user, and a plurality of accesses, based on the instruction given by the user.

7. The video information providing/receiving system as set forth in claim 2, wherein:

said video information editing means edits the video information based on either of the operation history information, which is stored in said operation history storing means, corresponding to the requested video information, and the user who makes the request or the user terminal operated by the user, and the operation history information, which is stored in said operation history storing means, corresponding to a user other than the user who makes the request and other than a user using a terminal excluding the user terminal operated by the user, or the user terminal operated by the user, according to the instruction given by the user.

8. The video information providing/receiving system as set forth in claim 7, wherein:

when said operation history information writing means writes the operation history information for each of the plurality of pieces of the video information, and for each user who accesses each piece of the video information or each user terminal operated by the user, said operation history information writing means determines whether to permit a use by a user other than the user corresponding to the operation history information, and other than the user using the terminal excluding the user terminal operated by the user, or by the user terminal operated by the user.

9. The video information providing/receiving system as set forth in claim 2, wherein:

when said operation history information writing means writes the operation history information for each of the plurality of pieces of the video information, for each user who accesses each piece of the video information or each user terminal operated by the user, said operation history information writing means determines whether to permit said video information editing means to edit the video information according to an interrupt manually operated on the user terminal used by the user; and when it is determined to permit said video information editing means to edit the video information, said video information editing means edits the video information according to the interrupt manually operated on the user terminal used by the user, while editing the requested video information based on the operation history information.

10. A video information providing/receiving system where a user terminal instructs a video information providing host of various operations via a transmission line, and receives video information corresponding to the various operations from the video information providing host, the user terminal comprising:

operation history information storing means for storing operation history information; and operation history information writing means for writing a history of the various operations corresponding to the video information received by the user terminal to said operation history information storing means as the operation history information, so as to allow the video information to be played back with operations the same as the various operations, while the video information providing host transmits the video information via the transmission line according to a request made by the user terminal.

11. The video information providing/receiving system as set forth in claim 10, wherein:

said operation history information writing means writes the operation history information to said operation history information storing means for each of a plurality of pieces of the video information, and for each user who accesses each piece of the video information or each user terminal which accesses each piece of the video information; and the user terminal further comprising:
a video information editing means for editing and playing back the requested video information received from the video information providing host, based on the operation history information corresponding to the requested video information and a user who makes the request, according to an instruction given by the user, when the user requests the video information providing host to transmit the video information from the user terminal, and when said operation history information storing means in the user terminal stores the operation history information corresponding to the requested video information and the user who makes the request.

12. The video information providing/receiving system as set forth in claim 11, wherein:

the user terminal further comprising:
buffer means for receiving the requested video information from the video information providing host for each predetermined period or amount, and storing each; and said video information editing means edits the video information stored in said buffer means.

13. The video information providing/receiving system as set forth in claim 11, wherein:

the user terminal further comprising:
buffer means for receiving a whole of the requested video information from said video information providing host, and storing it.

14. A video information providing/receiving method where a user terminal instructs a video information providing host of various operations via a transmission line, and receives video information corresponding to the various operations from the video information providing host, comprising the steps of:

storing operation history information; and writing a history of the various operations corresponding to the video information received by the user terminal to said operation history information storing means as the operation history information, so as to allow the video information to be played back with operations the same as the various operations, while the video information providing host transmits the video information via the transmission line according to a request made by the user terminal.

* * * * *